United States Patent

[11] 3,583,148

[72] Inventor Robert Wolber
 Lauterbach, Wurttemberg, Germany
[21] Appl. No. 840,231
[22] Filed July 9, 1969
[45] Patented June 8, 1971
[73] Assignee Gebruder Junghans G.m.b.H.
 Schramberg, Wurttemberg, Germany
[32] Priority July 10, 1968
[33] Germany
[31] J18166/83bGbm

[54] CONTACT DEVICE FOR A BATTERY FED ELECTRIC CLOCKWORK MECHANISM
 8 Claims, 3 Drawing Figs.
[52] U.S. Cl. .................................................... 58/23, 58/28
[51] Int. Cl. ...................................................... G04c 3/00
[50] Field of Search ........................................... 58/23, 23 BA, 53, 28

[56] References Cited
UNITED STATES PATENTS
3,049,861 8/1962 Jensen .............................. 58/23

Primary Examiner—Richard B. Wilkinson
Assistant Examiner—Edith C. Simmons
Attorney—Burns, Doane, Benedict, Swecker & Mathis ABSTRACT: A battery driven electric clockwork mechanism is provided with a battery retaining arrangement comprising an electrical contact tongue, formed as an integral part of the mechanism, and a laminated electrical contact plate which engages an electrical contact portion of the mechanism. A notch may be formed in the tongue to ensure good contact between a positive pole of a battery and the tongue. The laminated electrical contact plate is formed at one end in a U-shaped configuration which urges against the negative pole of the battery and, thereby, forces the positive pole into pressure contact with the tongue. The clock casing may be formed with a projection for laterally supporting the tongue and an indentation may additionally be formed in the casing to support the laminated electrical contact plate therein. Pegs may be provided on the casing to removably attach the laminated electrical contact plate thereto.

INVENTOR.
ROBERT WOLBER

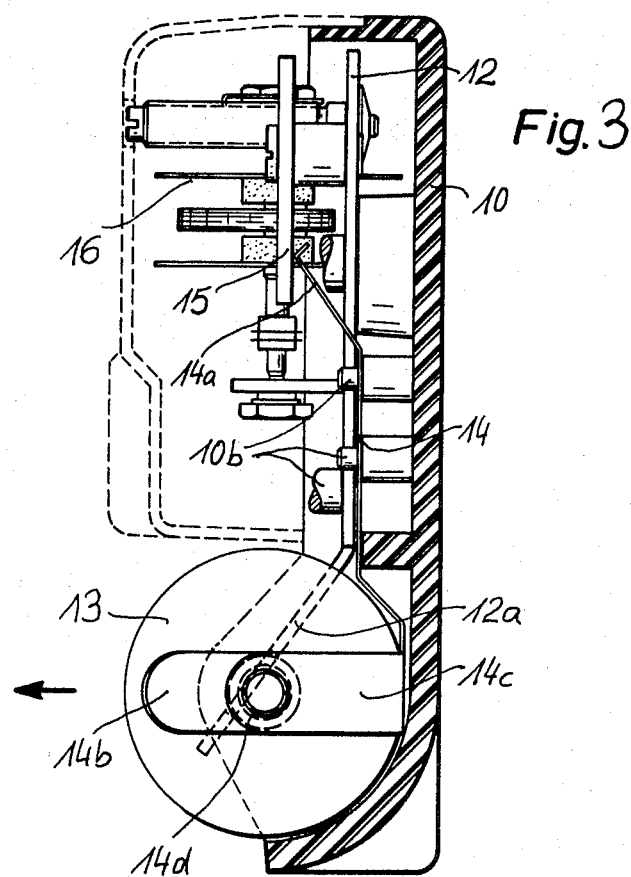

3,583,148

CONTACT DEVICE FOR A BATTERY FED ELECTRIC CLOCKWORK MECHANISM

BACKGROUND OF THE INVENTION

The invention relates to battery driven clocks and, more particularly, to a contact device for a battery fed electric clockwork mechanism with a holding arrangement applied to the poles of the battery and arranged in a part of a casing of the mechanism.

Battery fed electric clockwork mechanisms have been known where two contact tongues have been provided for the battery connection, which tongues are brought into electrical connection with the poles of the battery. Each contact tongue is connected, at one end, with a holding element applying to a pole of the battery and, at the other end, it is connected by screws, rivets or similar things with a switching element of the clockwork mechanism.

Furthermore, a contact arrangement for a battery fed electric clockwork mechanism has been known where a plate bar of the clockwork mechanism has been provided with a punched out contact tongue to which a further contact element has been riveted with a screw for applying to the pole of the battery. The manufacture of this contact arrangement is relatively expensive.

OBJECTS AND SUMMARY OF THE INVENTION

The present invention is based on the task of providing a contact arrangement of the initially mentioned kind which can be produced in a particularly simple manner. According to the invention, this is achieved through the provision of a punched out contact tongue which leads directly into the area of a pole of a battery, and the provision of a second contact plate, resiliently applying against the second pole of the battery. Preferably, the contact tongue is provided with an indentation receiving the pole of the battery. In this manner, good contact with the battery is produced in the simplest manner.

In one feature of the invention, the casing of the mechanism may be provided with a projection for laterally supporting the contact tongue in the area of the contact tongue where the pole of the battery bears against the tongue.

In another feature of the invention, the end of the contact plate applying against the pole of a battery may be developed U-shaped and may apply against a pole of the battery with one leg, while the other leg is supported by the casing of the mechanism. The leg, which is supported by the casing of the mechanism, may be provided with a stamped out eye which engages within an indentation provided in the casing of the mechanism. The contact plate may be mounted by rivets to an extruded peg of the plastic casing of the mechanism. The contact plate, at its end facing away from the battery, is applied to an electrically conductive element of the driving circuit of the clockwork mechanism.

The invention is explained in more detail in the following paragraphs on the basis of the following drawing in which the preferred embodiment is presented by way of example. In the drawing:

DRAWING OF PREFERRED EMBODIMENT

FIG. 3 shows a sectional view taken along the line III–III in FIG. 1.

DETAILED DESCRIPTION

Figure 1:
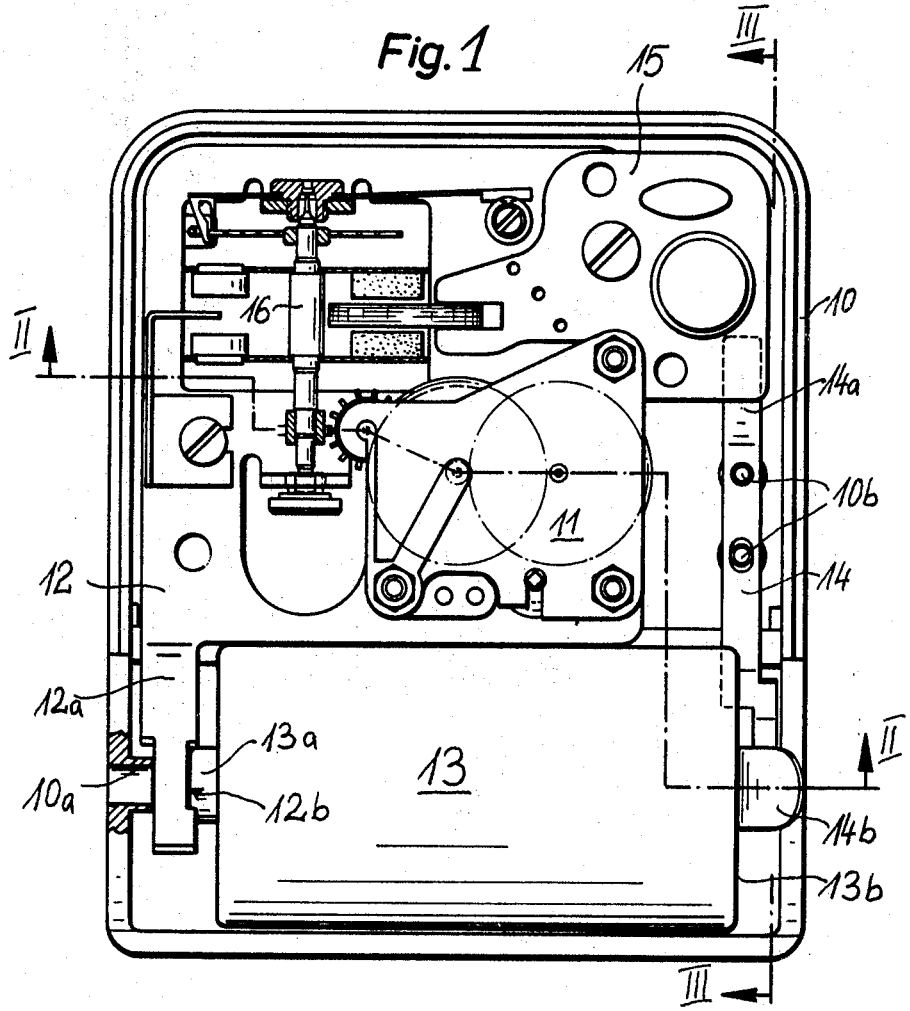
FIG. 1 shows an elevational view of a clockwork mechanism viewed from the rear.

In the drawing, the numeral 10 generally designates a casing of the mechanism which is extruded preferably from plastic. 11 is a clockwork mechanism, one bar plate of which is designated by 12. This bar plate 12 is in electrically conductive connection with the arrangement for a driving circuit 15 for balance wheels 16.

The plate bar 12 is provided with a stamped out tongue 12a integral therewith, the free end of which has an indentation 12b. The contact tongue 12a is bent out of the plane of the plate bar 12 in such a manner, that the end containing the indentation 12b reaches into the area of a positive pole 13a of a battery 13. The indentation 12b is developed in such a manner, that it can receive the positive pole 13a of the battery 13. The casing 10 of the mechanism has been provided at 10a with a projection pointed toward the contact tongue 12a, which serves as a lateral support for the contact tongue 12a whenever the battery is pressed laterally against the contact tongue 12a.

A laminated contact plate 14 provides a current supply for the driving circuit arrangement 15. This contact 14 is attached to the casing 10 of the mechanism by means of two pegs 10b. The contact 14 can merely be plugged on these pegs 10b which preferably are extruded onto the casing of the mechanism, so that the contact 14 can easily be taken off at any time and replaced by a new contact 14 in case, for example, the old contact 14 may become oxidized.

Figure 2:
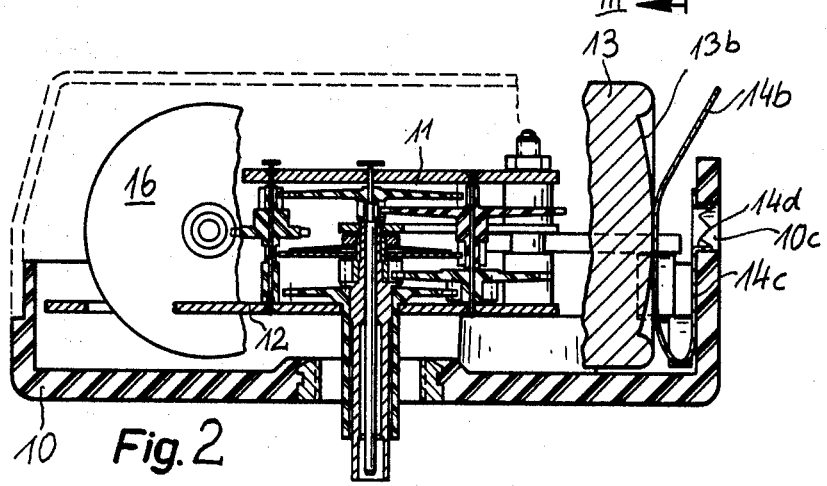
FIG. 2 shows a sectional view taken along the line II–II in FIG. 1.

The end of the contact 14 applying against a negative pole 13b of the battery is U-shaped with two legs 14b and 14c (FIG. 2). One leg 14b is applied against the negative pole 13b of the battery 13, while the other shorter leg 14c is supported by the casing 10 of the mechanism, so that good contact pressure of the leg 14b against the negative pole 13b of the battery 13 will be assured. In order to prevent any vertical pulling out of the contact 14 from the casing 10 of the mechanism during removal of the battery 13, a pressed out eye 14d has been provided within the leg 14c, which eye 14d engages within an indentation 10c, preferably a bore, formed in the casing 10 of the mechanism.

The end 14a of the contact 14, which is away from the battery 13, is angled in such a way that it fits against an electrically conductive portion of the driving circuit arrangement 15. This driving circuit arrangement may be provided, for example, with a printed circuit, whereby the end 14a of the contact 14 electrically connects with the printed circuit. Thus, a second good electrical connection to the driving circuit arrangement 15 is provided. By the resilient nature of the U-shaped end defined by 14b and 14c of the contact 14, the battery 13 is urged with its positive pole 13a against the contact tongue 12a. Therefore, no special attachment device, such as a screw, is required.

I claim:

1. An electrical contact arrangement for a battery driven electric clockwork mechanism comprising:
   a. a mechanism casing;
   b. a battery holding arrangement within said casing and engaging the poles of a battery;
   c. an electrically conductive bar plate for supporting said electric clockwork mechanism;
   d. an electric contact tongue formed integrally with said bar plate and comprising a portion of said battery holding arrangement;
   e. said poles of said battery comprising a positive pole and a negative pole;
   f. said electrical contact tongue engaging said positive pole of said battery;
   g. a laminated electrical contact plate resiliently urging against said negative pole of said battery; and
   h. said laminated electrical contact plate being in electrical contact with said electric clockwork mechanism.

2. The arrangement according to claim 1, wherein said electrical contact tongue is formed with an indentation for receiving said first positive pole of said battery.

3. The arrangement according to claim 1, wherein said mechanism casing is formed with a projection for supporting said contact tongue against lateral forces applied to said contact tongue by said positive pole of said battery.

4. The arrangement according to claim 1, wherein a first end of said laminated electrical contact plate is formed in a generally U-shaped configuration having first and second legs:
   a. said first leg engaging said negative pole of said battery; and b. said second leg being supported by said mechanism casing.

5. The arrangement according to claim 4, wherein said second leg is formed with a pressed out eye and said mechanism casing is formed with an indentation for supportingly receiving said eye.

6. The arrangement according to claim 1, wherein said mechanism casing is formed with at least one peg and said laminated electrical contact plate is attached to said casing by means of said at least one peg.

7. The arrangement according to claim 6 wherein said at least one peg is riveted to said laminated electrical contact plate.

8. The arrangement according to claim 4 wherein:
a. said electric clockwork mechanism includes a driving circuit arrangement;
b. said driving circuit arrangement having an electrically conductive portion; and
c. a second end of said laminated electrical contact plate engaging said electrically conductive portion of said driving circuit arrangement.